Figure 5:
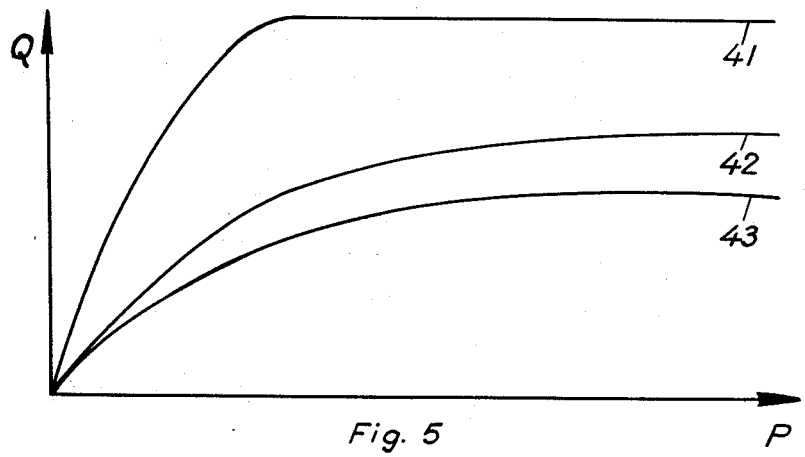

Nov. 10, 1964
K. A. G. ATTEBO
3,156,262
FLOW CONTROL VALVES
Filed Feb. 5, 1963
2 Sheets-Sheet 1
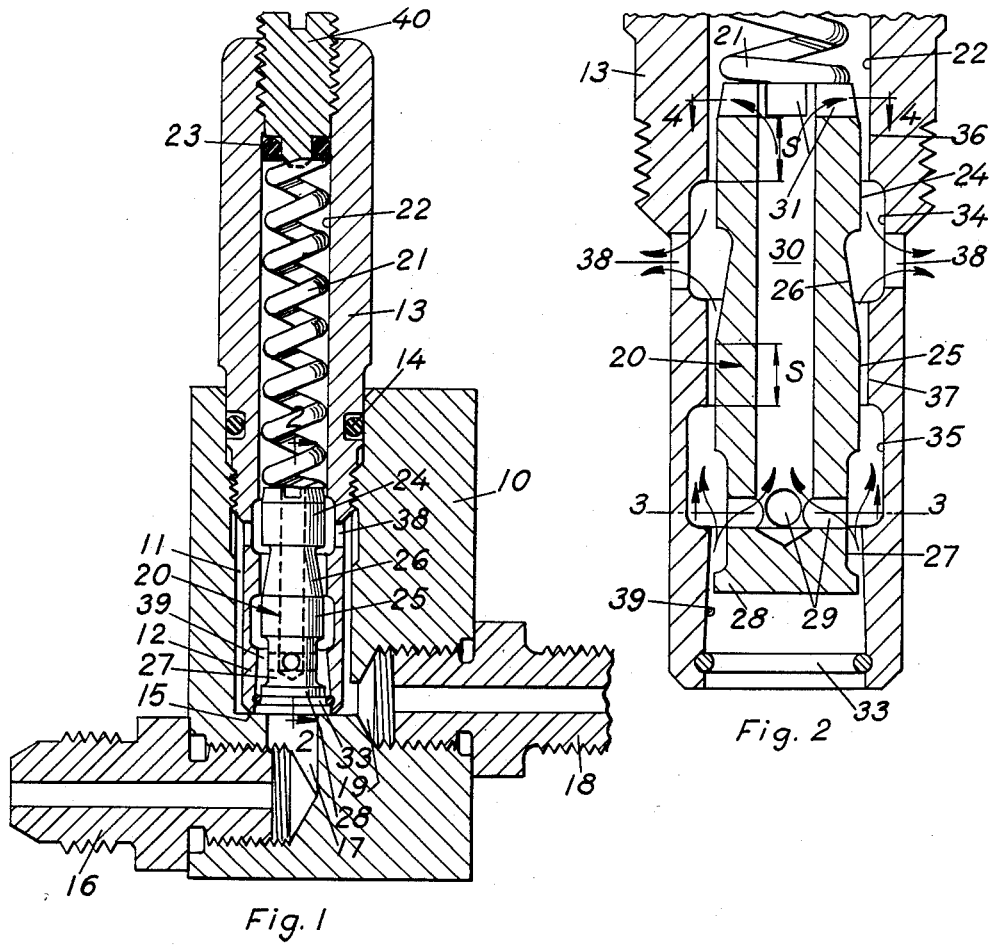
Fig. 1
Fig. 2
Fig. 3
Fig. 4
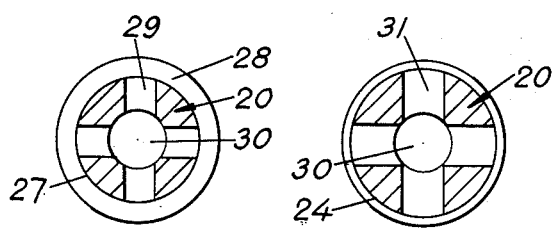
INVENTOR.
KURT ANDERS GUSTAV ATTEBO
BY
ATTORNEY Nov. 10, 1964  K. A. G. ATTEBO  3,156,262
FLOW CONTROL VALVES
Filed Feb. 5, 1963  2 Sheets-Sheet 2

INVENTOR.
KURT ANDERS GUSTAV ATTEBO
BY
ATTORNEY

United States Patent Office 3,156,262
Patented Nov. 10, 1964

3,156,262
FLOW CONTROL VALVES
Kurt Anders Gustav Attebo, Nykoping, Sweden, assignor to Atlas Copco Aktiebolag, Nacka, Sweden, a corporation of Sweden
Filed Feb. 5, 1963, Ser. No. 256,290
12 Claims. (Cl. 138—43)

This invention relates generally to flow control valves and more specifically to flow control valves for causing the flow of fluid therethrough to be in a desired relationship with respect to a selected variable. Such valves are for example generally employed in hydraulic circuitry for maintaining a constant rate of flow or causing the rate of flow to change in a predetermined manner under varying pressure conditions and the controlling element therein is usually an axially movable valve body or piston responsive in its movement to the pressure differential across the valve. Heretofore leakage along the exterior of the valve body has always caused a certain degree of unreliability in the flow control. The use of very close tolerances for reducing leakage has in many cases been responsible for faulty operation because of the tendency of the hydraulic fluid to cause binding of the valve body against the wall of the passage wherein the valve body is movable, a tendency increasing with increased thinness of the fluid film around the valve body. Another source of unreliability are dynamic forces acting on the valve body and it has hitherto been difficult to balance these forces to a full extent.

It is a primary object of the invention to provide a flow control valve in which the hitherto harmful effect of leakage is turned to an advantage and is utilized for effective basic action of the valve. Another object of the invention is to provide a flow control valve in which binding of the valve body is fully eliminated thanks to the loose mounting of the valve body in its mounting passages. A further object of the invention is to provide a flow control valve of the above character in which the valve body is dynamically fully balanced. A still further object of the invention is to provide a flow control valve of the above character in which the rate of flow therethrough automatically is kept in a desired predetermined relationship with respect to varying pressure conditions across the valve. A still further object of the invention is to provide a flow control valve of the above character which is simple and reliable in design and is of small and compact size.

The above and other objects of the invention will become obvious from the following description and from the accompanying drawings in which three embodiments of the invention are illustrated by way of example. It should be understood that these embodiments are only illustrative of the invention and that various further modifications may be made within the scope of the claims without departing from the scope of the invention.

Figures 7, 8:
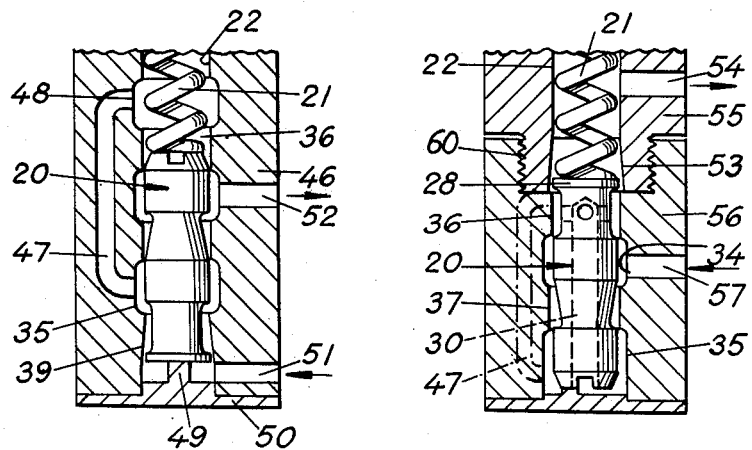
Figure 6:
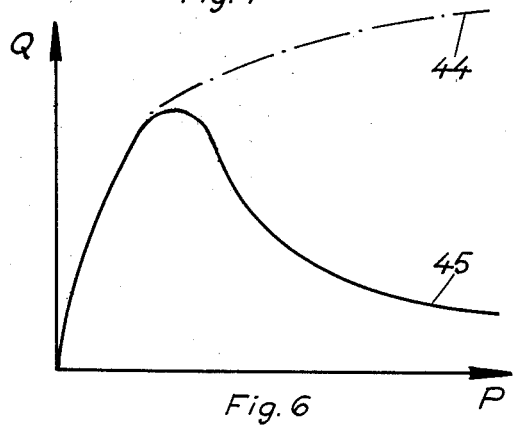

In the drawings, FIG. 1 shows a longitudinal sectional view of a flow control valve according to the invention. FIG. 2 is an enlarged longitudinal sectional view on line 2—2 in FIG. 1. FIG. 3 is a transverse sectional view on line 3—3 in FIG. 2. FIG. 4 is a transverse sectional view on line 4—4 in FIG. 2. FIG. 5 is a graph showing the relation between the flow rate and the pressure drop across the control valve for a control valve according to FIGS. 1–4 chosen for maintaining a constant flow rate. FIG. 6 is a graph corresponding to FIG. 5 but showing the influence on the flow rate of changes in spring rate of the resilient means acting on the control valve body. FIG. 7 is a diagrammatic longitudinal sectional view through a modified embodiment of the control valve and FIG. 8 shows in longitudinal section a still further modification of the control valve.

Referring to FIGS. 1–4 the flow control valve incorporates a housing 10 provided with an internal bore 11 forming an annular passage around an elongated cylinder sleeve 12. The cylinder sleeve 12 forms a part of a valve case 13 threadedly secured to the housing 10 at the outer portion of the bore 11 and sealed against leakage as by an O-ring 14 lying in a groove in the case. The sleeve 12 bears at its open end tightly against a shoulder 15 in the bore 11. An inlet fitting 16 is threaded into the housing 10 and communicates via a passage 17 surrounded by the shoulder 15 with the open end of the sleeve 12. An outlet fitting 18, which together with the fitting 16 serves for coupling the control valve housing 10 in the fluid line wherein the flow is to be controlled, is threaded into the housing 10 and communicates via a passage 19 with the annular passage in the bore 11.

A valve body 20 is loosely and axially shiftably arranged in the cylinder sleeve 12 and may be displaced against the resistance of resilient means such as a helical spring 21 disposed in a bore 22 in the valve case 13. An O-ring 23 is arranged in and sealed to the bore 22 as well as to an adjusting plug 40 threadedly and axially adjustably received and retained at the rear of the valve case 13. The spring 21 bears against a washer backed by the O-ring 23 as well as against the rear face of the valve body 20 and by changing of the axial position of plug 40 the tension of the spring 21 may be readily adjusted.

The valve body 20 is provided with two axially spaced cylindrical lands 24 and 25 of equal diameters and has intermediate said lands a conically reduced guide portion 26, while upstream of the land 25 and spaced therefrom by a circumferenital groove 27 there is provided a circumferential flange 28 extending around the front face of the valve body 20.

From the groove 27 openings 29, FIG. 2, extend radially inward and are connected to a rearwardly directed passage 30 in the valve body 20 leading to the bore 22 in the valve case 13. The rear face of the valve body 20 is provided with radial grooves 31.

In the most extended position of the spring 21 illustrated in FIG. 1, the flange 28 of the valve body 20 rests against a spring ring 33 carried in a groove at the inlet end of the sleeve 12. In such position the lands 24, 25 are positioned in circumferential grooves 34 and 35, respectively, provided in axially spaced disposition in the sleeve 12. Rearwardly of the grooves 34, 35 there are formed cylindrical restrictions or throats 36, 37 of equal diameter, for example having the diameter of the bore 22, and providing a tight enough fit for the lands 24, 25, when dispaced thereinto, to cause resistance to fluid flow past the exterior of the lands, with the resistance varying in dependance on the depth of penetration $s$, FIG. 2, of the lands 24, 25 into the throats 36, 37. For effective action the play between the lands and their corresponding throats will usually be some hundredths of a millimeter, for .04 to .06 mm. for a valve body diameter of 8 mm. The groove 34 is provided with a number of radial outlet openings 38 leading to the bore 11 of the housing 10.

The flange 28 of the valve body 20 is axially movably arranged in a throttling passage 39 extending between the spring ring 33 and the groove 35. The periphery of the flange 28 is spaced from the inside surface of the passage 39 creating an annular orifice or restriction around the flange for purposes of producing a pressure drop in the fluid flow past the flange 28.

In operation, fluid entering through the fitting 16 and the passage 17 will pass into the throttling passage 39 of the sleeve 12 creating a pressure drop across the flange 28 by which the lands 24, 25 of the valve body 20 are displaced axially a certain distance, for example distance s, FIG. 2, rearwardly against the action of the spring 21 into the throats 36, 37 until a state of equilibrium occurs. Rearwardly of the flange 28 the fluid is branched in a first straight branch in which the flow passes the groove 35 and the throat 37 on its way to the groove 34. A second curved branch is formed by the openings 29, the passage 30 and the grooves 31 leading for pressure equalization to the rear face of the valve body 20 and thence to the throat 36 and the groove 34 to combine with the first branch for continued common flow through the radial openings 38 to the bore 11 and on through passage 19 and fitting 18. The throttling action in the thin cylindrical fluid film between the throats 36, 37 and the lands 24, 25 restricts fluid flow in the two branches in dependance on the depth of penetration s.

If by some reason the effective inlet pressure is increased, more fluid will tend to pass the valve body 20. This produces an increase of the pressure drop across the flange 28, a corresponding additional compression of the spring 21, and an axial shift of the valve member 20 towards a new position of equilibrium, in which the penetration s of the lands 24, 25 will be correspondingly increased 'o cause greater restriction and throttling of the flow in the two branches. The tendency of reduction in the effective pressure to reduce flow is, on the other hand, immediately checked by the spring 21 in returning the valve member 20 and reducing the penetration s of the lands 24, 25 and the throttling until equilibrium is again reached. By suitably choosing the spring rate and pre-compression of the spring 21, the resistance to flow at the lands 24, 25 can be adjusted to increase or decrease exactly the amount necessary for causing the fluid flow to receive the desired value, for example, as in the illustrative control valve, to resume its original value, notwithstanding the fact that there has been created a larger or smaller total pressure drop across the valve. In other words, the position of the valve body 20 will in the illustrative control valve automatically be adjusted relative to the throats 36, 37 to maintain a constant rate of flow through the control valve despite variations in effective pressure.

It is readily seen that because of their identical restrictions the two branches combining in the groove 34 are equal as regards flow rate but are oppositely directed regarding direction of flow. Dynamic forces caused by variations in flow rate will therefore always be fully balanced, whereby disturbances in the equilibrium of the valve body 20 are prevented.

With increased compression the spring 21 exerts an increasing force on the valve body 20. For a more exact operation of the control valve the varying spring force should be compensated. To this end, the throttling passage 39 is slightly tapered inwardly downstream of the spring ring 33. A suitable taper may for example be about 5 thousandths of a millimeter per millimeter for co-operation with a valve body flange 28 having a diameter of 8 mm. As the flange 28 moves away from the spring ring 33 the annular orifice or restriction therearound in effect decreases causing an additional increase of the pressure drop, and the taper of the passage 39 is chosen and may vary in a manner to provide full compensation of the increased force exerted by the spring 21.

FIG. 5 gives diagrammatically an illustration of the constant flow rate control obtainable in a valve according to FIGS. 1–4 with Q representing the flow rate and P the pressure drop across the control valve. For a certain constant spring rate chosen for spring 21 there are shown the resultant control curves 41–43 for three different selected values of percompression of the spring 21. In these curves precompression decreases from a maximum value for curve 41 to almost zero for curve 43. As readily seen it is thus possible to select the desired rate of flow to be maintained constant merely by changing the axial position of the plug 40, whereby precompression of the spring 21 is defined.

Sometimes a performance of the control valve other than the one giving constant flow rate relationship is desired. For example in rotary hydraulic gear motors there occurs increased leakage with increased pressure and in such case the control valve preferably should compensate the leakage by the flow rate therethrough increasing with increased pressure. In other cases, such as maximum horsepower control for hydraulic motors, a suitably decreasing flow rate curve is desired. These relationships can be arrived at by suitable substitution of the spring 21 for other springs having different spring rates as illustrated in FIG. 6, in which the curve 44 represents the performance of a valve body and spring assembly with the spring precompressed and having a sufficiently high spring rate to give increasing flow rate with increased pressure drop across the control valve. In case a comparatively low spring rate is chosen while spring precompression is left unchanged, this results in curve 45, giving a valve performance suitable for horsepower control.

Thus, by suitable selection of the spring rate or characteristic for spring 21, the rate of flow through the control valve shown can automatically be kept in a desired predetermined relationship with respect to varying pressure conditions adjacent the valve.

In the modification according to FIG. 7 the valve body 20 and spring 21 are inserted in a housing 46 in which there is provided an exterior passage 47 for branching off fluid flow from the groove 35 and leading it to a rear groove 48 provided in the bore 22 to the rear of the throat 36. Instead the series of passages 29–31 in FIGS. 1–4 is omitted and the valve member 20 is solid. In its forward position the valve member 20 rests against an abutment 49 provided on a front cover 50. The throttling passage 39 receives fluid via a radial inlet passage 51 and there is also depicted an outlet passage 52. The operation of the control valve according to FIG. 7 is identical with operation of the embodiment of FIGS. 1–4.

The modification in FIG. 8 is characterized by the branching and combining of fluid flow taking place upstream of the throttling passage. To this end the throttling passage 53 is provided at the inner end of the bore 22 and is carried together with the spring 21 and an outlet passage 54 in a housing portion 55, while the valve body 20 is movably mounted in inverted position in a housing portion 56. The housing portions are interconnected as by threads 60 with the spring 21 bearing against the flange 28. In the housing portion 56 there are provided the grooves 34, 35 and throats 36 and 37, as previously, but incoming flow is in this instance directed via an inlet passage 57 to the groove 34 wherein is performed an immediate branching of fluid flow in opposite directions past the respective throats 36 and 37.

Via the internal passage 30 in the valve member 20 or, as an alternative, via the exterior passage 47 in the housing portion 56 the fluid branches are thereupon united prior to reaching the throttling passage 53. The operation in FIG. 8 is identical with operation of the embodiments in FIG. 1–4 and FIG. 7. By fine axial interadjustment between the housing portions 55 and 56 at the threaded connection 60, the initial annular space between the flange 28 and the throttling passage 53 may be changed to some extent, and this will usually be sufficient to provide an additional means for adjusting the rate of flow to various levels similarly to the curves in FIG. 5, but without making appreciable changes in spring precompression. It is for example readily seen that an enlargement of the annular space by screwing the portion 55 axially away from portion 56 will demand a larger flow past the valve body for producing the necessary axial throttling displacement thereof.

What I claim is:

1. A flow control valve comprising a housing having an elongated fluid passage therein, an inlet opening and an outlet opening in said passage, a valve body axially movably arranged in said passage, cylindrical throat means displaced from said outlet opening in said passage, said valve body having a circumferential clearance in said passage to allow fluid flow between said openings along the exterior of said valve body, circumferential land means on said valve body displaceable into said throat means, said land means having a tight enough fit in said throat means to cause resistance to fluid flow along the exterior of said land means in dependance on the depth of penetration of said land means into said throat means, resilient means in said housing bearing against said valve body to resist penetration of said land means into said throat means, and means on said valve body for producing under admittance of fluid flow from said inlet opening to said outlet opening a pressure drop effective against said valve body and tending to displace said land means into said throat means against the resistance of said resilient means.

2. A flow control valve comprising a housing having an elongated fluid passage therein, an inlet opening and an outlet opening in said passage, a valve body axially movably arranged in said passage, a pair of cylindrical throats at opposed sides axially of one of said openings in said passage, said valve body loosely carried in said passage to allow fluid flow between said openings along the exterior of said valve body, a pair of spaced circumferential lands on said valve body, each displaceable into one of said throats, said lands having a tight enough fit in said throats to cause resistance to fluid flow along the exterior of said lands in dependance on the depth of penetration of said lands into said throats, resilient means in said housing bearing against said valve body to resist penetration of said lands into said throats, means on said valve body for producing under admittance of fluid flow from said inlet opening to said outlet opening a pressure drop effective against said valve body and tending to displace said lands into said throats against the resistance of said resilient means, and passage means in said housing for branching the fluid flow at a point upstream of said lands and directing said branched fluid flow to flow along the exterior of one of said lands in the opposite direction to the flow along the exterior of the other said land.

3. A flow control valve as set forth in claim 2 in which said passage means are provided in said valve body.

4. A flow control valve comprising a housing having a fluid inlet and a fluid outlet, passage means in said housing between said inlet and said outlet for dividing the fluid flow therebetween in a first and a second branch, while leaving a portion of said flow undivided, an elongated member axially movably arranged in a portion of said first and a portion of said second branch with fluid flow being oppositely directed in said branch portions, said member being loosely carried in said branches to allow fluid flow between said inlet and said outlet past and along the exterior of said member, a cylindrical throat in each of said portions of said first and second branch, a first and second circumferential land in axially spaced disposition on said member each displaceable into one of said throats, said lands having a tight enough fit in said throats to cause resistance to fluid flow along the exterior of said lands in dependence on the depth of penetration of said lands into said throats, resilient means in said housing bearing against said member to resist penetration of said lands into said throats, and means on said member for producing a pressure drop effective against said member and tending to displace said lands into said throats against the resistance of said resilient means, said pressure drop producing means disposed in said undivided portion of the fluid flow between said inlet and said outlet.

5. A fluid flow restrictor comprising a housing having an elongated fluid passage therein, an inlet opening and an outlet opening in said passage, an elongated member axially movably arranged in and relative to said passage, said member being loosely carried in said passage to allow fluid flow between said openings along the exterior of said member, a pair of cylindrical throats at opposed sides axially of one of said openings, a pair of circumferential lands in axially spaced disposition on said member each displaceable into one of said throats, said lands having a tight enough fit in said throats to cause resistance to fluid flow along the exterior of said lands in dependence on the depth of penetration of said lands into said throats, means in said housing for branching the fluid flow between said openings in two branches and directing said branches to flow along the exterior of said lands in opposite directions, and means in said housing for adjusting the axial position of said member relative to said throats.

6. A flow control valve comprising a housing having an elongated fluid passage therein, an inlet opening and an outlet opening included in said passage, an elongated valve body axially movably arranged in said passage intermediate said openings, said valve body being loosely carried in said passage to allow fluid flow between said openings along the exterior of said valve body, first annular restriction means for said exterior fluid flow provided between the inside of said passage and said valve body, said first restriction means producing a pressure drop effective against said valve body and tending to displace said valve body in one direction axially in said passage, resilient means in said housing bearing against said valve body and tending to displace said valve body axially oppositely to said one direction, and second annular restriction means for said exterior fluid flow provided between the inside of said passage and said valve body, said second restriction means having an axial width increasing with axial displacement of said valve body in said one direction and decreasing with displacement of said valve body in opposite direction.

7. A flow control valve as set forth in claim 6 in which there are provided means for varying the radial width of said first annular restriction means in dependance on axial position of said valve body in said passage in a manner to compensate changes in spring force of said resilient means by corresponding changes of the pressure drop produced in said first restriction means.

8. A flow control valve comprising a housing having an inlet opening and an outlet opening, passage means in said housing between said openings for dividing the fluid flow therebetween in a first and a second branch, while leaving a portion thereof undivided, an elongated valve body axially movably arranged in a portion of said first and a portion of said second branch as well as in said undivided portion of said flow in said passage means, said valve body being loosely carried in said branches and said undivided portion to allow fluid flow between said openings past and along the exterior of said valve body, a first annular restriction for said exterior fluid flow provided between the inside of said passage means and said valve body in said undivided portion of said passage means, said first restriction producing a pressure drop effective against said valve body and tending to displace said valve body in one direction axially in said passage means, resilient means in said housing bearing against said valve body and tending to displace said valve body axially oppositely to said one direction, and spaced apart second and third restrictions for said exterior fluid flow provided between the inside of said passage means and said valve body in said portions of said first and second branch with fluid flow being oppositely directed in said branch portions, said second and third restrictions having an axial width increasing with axial displacement of said valve body in said one direction and decreasing with displacement of said valve body in said opposite direction.

9. A flow control valve comprising a housing having a fluid inlet opening and a fluid outlet opening, passage means in said housing between said openings for dividing the fluid flow therebetween in a first and a second branch while leaving a portion thereof undivided, an elongated valve body axially movably arranged in a portion of said first and a portion of said second branch as well as in said undivided portion of said flow in said passage means, said valve body being loosely carried in said branches and said undivided portion to allow fluid flow between said inlet and said outlet past and along the exterior of said valve body, a first annular restriction for said exterior fluid flow provided between the inside of said passage means and said valve body in said undivided portion of said passage means, said first restriction producing a pressure drop effective against said valve body and tending to displace said valve body in one direction axially in said passage means, spring means in said housing bearing against said valve body and tending to displace said valve body axially oppositely to said one direction, spaced apart second and third restrictions for said exterior fluid flow provided between the inside of said passage means and said valve body in said portions of said first and second branch, said second and third restrictions having an axial width increasing with axial displacement of said valve body in said one direction and decreasing with displacement of said valve body in opposite direction, and means for varying the radial width of said first annular restriction in dependence on axial position of said valve body in said passage means in a manner to compensate changes in spring force of said spring means by corresponding changes of the pressure drop produced in said first restriction.

10. A flow control valve as set forth in claim 9, in which said first annular restriction is defined by the annular space around a circumferential flange on said valve body and the inside of said passage, said varying means consisting of a radially inwardly tapering throat forming the inside of said passage around said flange.

11. A flow control valve comprising a housing having an elongated fluid passage therein, an inlet opening and an outlet opening included in said passage, an elongated valve body axially movably arranged in said passage intermediate said openings, said valve body being loosely carried in said passage to allow fluid flow between said openings along the exterior of said valve body, first annular restriction means for said exterior fluid flow provided between the inside of said passage and said valve body, said first restriction means producing a pressure drop effective against said valve body and tending to displace said valve body in one direction axially in said passage, resilient means in said housing bearing against said valve body and tending to displace said valve body axially oppositely to said one direction, means for varying the radial width of said first annular restriction means in dependence on axial position of said valve body in said passage means, second annular restriction means for said exterior fluid flow provided between the inside of said passage and said valve body, said second restriction means having an axial width increasing with axial displacement of said valve body in said one direction and decreasing with displacement of said valve body in opposite direction, and means for adjusting the axial position of said first restriction means relative to said second restriction means.

12. In a flow control device of the character described having a housing with a fluid passage disposed therein, said fluid passage having an inlet and an outlet, the combination which comprises a valve body movably disposed in said passage with the exterior thereof providing a clearance therearound in said passage for fluid flow between said inlet and said outlet, said valve body being movable in response to a pressure differential between the inlet side and the outlet side thereof, throat means disposed in said passage between said inlet and said outlet, land means disposed on said valve body for acting with said throat means to restrict said fluid flow from said inlet to said outlet in response to said movement of said valve body whereby said restriction is increased as said land means moves further into said throat means, and means for adjusting the response of said valve body to said pressure differential between the said inlet and the said outlet side thereof.

References Cited in the file of this patent

UNITED STATES PATENTS

| | | |
|---|---|---|
| 1,813,122 | Moore | July 7, 1931 |
| 1,925,786 | Brooks | Sept. 5, 1933 |
| 2,508,492 | Chace | May 23, 1950 |
| 2,555,597 | Nault | June 5, 1951 |
| 2,646,078 | Adams | July 21, 1953 |
| 2,984,261 | Kates | May 16, 1961 |